(No Model.)

F. BOWEN.
TUYERE.

No. 256,964.  Patented Apr. 25, 1882.

WITNESSES:
Chas. Nida
C. Sedgwick

INVENTOR:
F. Bowen
BY Munn & Co
ATTORNEYS.

UNITED STATES PATENT OFFICE.

FREDERICK BOWEN, OF BARNHART'S MILLS, PENNSYLVANIA.

TUYERE.

SPECIFICATION forming part of Letters Patent No. 256,964, dated April 25, 1882.

Application filed November 15, 1881. (No model.)

*To all whom it may concern:*

Be it known that I, FREDERICK BOWEN, of Barnhart's Mills, in the county of Butler and State of Pennsylvania, have invented a new and Improved Tuyere, of which the following is a full, clear, and exact description.

This invention relates to that class of tuyeres formed of coiled tubes in which water circulates, and has for its object to prevent the deposition of sediment in the tube forming the tuyere, thereby preventing the rapid destruction of the tuyere by the heat of the furnace.

The invention consists in a tuyere formed of two or more pipes which are coiled parallel to each other, thus producing a shorter circuit for the water and preventing any undue deposit of sediment in the pipes.

Reference is to be had to the accompanying drawings, forming part of this specification, in which similar letters of reference indicate corresponding parts in both the figures.

Figure 1:
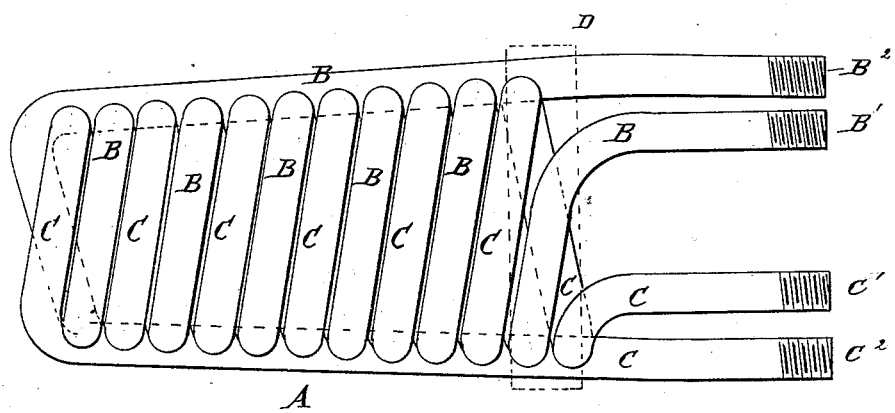
Figure 2:
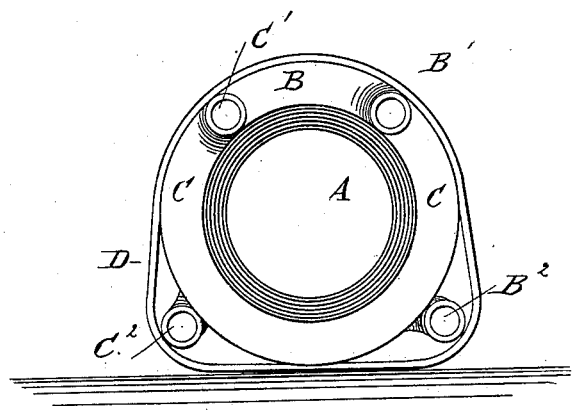

Figure 1 is a plan view of my improved tuyere. Fig. 2 is a rear end elevation of the same.

The tuyere A is formed of two coiled pipes, B and C, which are coiled parallel to each other, so that the tuyere will be formed of a single thickness of pipe—that is, a double coil is formed in the same manner that a screw with a double thread is formed. The water enters the pipe B at B', and after passing through the pipe B leaves it at B². The water enters the pipe C at C', and after passing through the pipe C leaves it at C².

The tuyere is made tapering toward the front end, and the pipes are arranged so close together that no air can escape between them. At the rear or thicker end the tuyere is surrounded by a band, D, which braces and stiffens the tuyere and holds the pipes together.

I have described the tuyere as being made of two coiled pipes; but it can be made of two or more such coiled pipes. If the tuyere is formed of two coiled pipes, the length of each such pipe will only have to be one-half of that of a single pipe required to make a tuyere of the same length. Consequently the water will pass through a shorter length of pipe, can cool the pipe much better, and cannot deposit as much sediment. This is of very great importance, for the deposition of sediment in tuyere-pipes and in tuyeres of any construction causes the destruction of the metal at those points where the sediment is deposited—that is, the sediment prevents the water from cooling the metal, and the intense heat of the furnace consumes the metal at those points very rapidly. The best way of avoiding this is to make the water-course as short as possible, and for that reason I arrange two or more coiled pipes in the tuyere instead of one.

Either water-outlet B² or C² may be plugged or closed, if desired, to increase the pressure of water within the tuyere.

Having thus described my invention, I claim as new and desire to secure by Letters Patent—

1. A tuyere made, substantially as herein shown and described, of two or more coiled pipes, as set forth.

2. A tuyere made of the pipes B and C, coiled parallel with each other, substantially as herein shown and described, and for the purposes set forth.

3. In a tuyere, the combination, with the coiled pipes B and C, of the band D, surrounding the tuyere and holding the pipes together, substantially as herein shown and described, and for the purpose set forth.

FREDERICK BOWEN.

Witnesses:
JAMES SELLERS,
SAML. F. SHOWALTER.